United States Patent [19]

Yang

[11] Patent Number: 4,883,684
[45] Date of Patent: Nov. 28, 1989

[54] FUNCTIONAL HARDSTOCK FAT COMPOSITION

[75] Inventor: David K. Yang, Cincinnati, Ohio

[73] Assignee: The Procter & Gamble Company, Cincinnati, Ohio

[21] Appl. No.: 213,959

[22] Filed: Jul. 1, 1988

[51] Int. Cl.$^4$ .............................................. A23D 5/00
[52] U.S. Cl. ................................... 426/607; 426/601; 426/611
[58] Field of Search ............................. 426/601, 607; 260/410.7

[56] References Cited

U.S. PATENT DOCUMENTS

| | | | |
|---|---|---|---|
| 2,521,219 | 9/1950 | Holman et al. | 99/118 |
| 3,129,102 | 4/1984 | Sanders | 99/128 |
| 3,253,927 | 5/1966 | Going et al. | 426/607 |
| 3,265,507 | 8/1966 | Japikse | 99/128 |
| 3,597,230 | 8/1971 | Colby et al. | 99/122 |
| 3,600,186 | 8/1971 | Mattson et al. | 426/611 |
| 3,600,195 | 8/1971 | Westenberg | 99/122 |
| 3,671,267 | 6/1972 | Gooding et al. | 99/128 |
| 3,706,578 | 12/1972 | Bence | 99/118 R |
| 3,900,503 | 8/1975 | McNaught | 426/603 |
| 4,016,302 | 4/1977 | Kattenberg | 426/607 |
| 4,183,971 | 11/1980 | Minowa | 426/607 |
| 4,288,378 | 9/1971 | Japikse et al. | 260/409 |
| 4,316,919 | 2/1982 | Pelloso | 426/603 |
| 4,335,156 | 9/1982 | Kogan | 426/603 |
| 4,341,814 | 7/1982 | McCoy | 426/607 |
| 4,447,462 | 5/1984 | Tafuri et al. | 426/601 |
| 4,460,614 | 7/1984 | Stratmann | 426/603 |
| 4,482,576 | 11/1984 | Boot | 426/603 |
| 4,521,440 | 6/1985 | Lansbergen | 426/602 |
| 4,567,056 | 1/1986 | Schmidt | 426/603 |
| 4,590,087 | 5/1986 | Pronk | 426/603 |
| 4,705,692 | 11/1987 | Tanaka | 426/607 |
| 4,726,959 | 2/1988 | Nomura et al. | 426/607 |

FOREIGN PATENT DOCUMENTS

| | | |
|---|---|---|
| 185524 | 6/1986 | European Pat. Off. |
| 268431 | 5/1988 | European Pat. Off. |
| 273352 | 10/1988 | European Pat. Off. |
| 62-118848 | 5/1987 | Japan |
| 62-29599 | 6/1987 | Japan |
| 63-22133 | 1/1988 | Japan |
| 63-126458 | 5/1988 | Japan |

OTHER PUBLICATIONS

Geeraert, et al., JAOCS, vol. 1, No. 1, p. 100, Jan. 1987.

*Primary Examiner*—Donald E. Czaja
*Assistant Examiner*—Evan Federman
*Attorney, Agent, or Firm*—Chester Cekala; Rose Ann Dabek; Richard C. Witte

[57] ABSTRACT

Hardstock fat compositions of the present invention are comprise triacylglycerides containing one linoleic acid acyl group ($C_{18:2}$) and two acyl groups independently selected from $C_{18:0}$-$C_{26:0}$ saturated fatty acyl groups. The hardstock fats are essentially free of cholesterolemic $C_{12:0}$-$C_{16:0}$ saturated fatty acids, yet retain all of the desirable characteristics which those cholesterolemic fatty acids impart. The hardstock fats are useful as components in comestible products, particularly in plastic shortenings.

8 Claims, No Drawings

FUNCTIONAL HARDSTOCK FAT COMPOSITION

TECHNICAL FIELD

The present invention relates to the field of hardstock fats, in particular fats made from triacylglycerides containing combinations of linoleic acid ($C_{18:2}$) and $C_{18:0}$-$C_{26:0}$ saturated fatty acids. The present invention also relates to food compositions containing these hardstock fats.

BACKGROUND OF THE INVENTION

Fats and oils are triacylglycerides, or triglycerides. They are called triacylglycerides because they are esters formed from the reaction of fatty acids with glycerol, a trihydroxy alcohol:

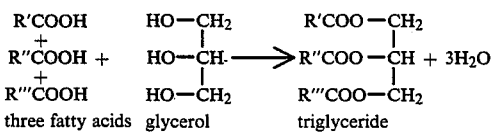

three fatty acids   glycerol   triglyceride

The distinction between a fat and an oil is arbitrary. At room temperature a fat is solid and an oil is liquid. Most triacylglycerides found in animals are fats, while those in plants tend to be oils.

Fats and oils, the most commonly occurring lipids, are a major source of dietary energy. Fats and oils are among the three major energy sources in the human diet (carbohydrates and proteins being the other two). However, fats and oils contain about twice as much energy per weight as carbohydrates or proteins.

Metabolically, ingested fats and oils are hydrolyzed into monoacylglycerides, diacylglycerides, fatty acids, and glycerol, all of which can be absorbed through the intestinal wall. The body then (1) utilizes these hydrolyzed or partially hydrolyzed fats as raw materials to synthesize its own fats, (2) converts the fatty acids to other compounds such as carbohydrates or cholesterol esters; or (3) converts the fatty acids to energy. The effects of dietary fats on cholesterol metabolism is of particular interest due to reports which link high levels of cholesterol in the blood (hypercholesterolemia) with arterial disease.

Low fat diets have long been known to be an effective means for lowering the serum-cholesterol level in humans, and, thereby lowering the risk of hypercholesterolemia (see Keys et al., *Science* 112, 79 (1950); Mellinkoff et al., *Am. J. Med. Sci.*, 220,203 (1950); Groen et al., *Voeding*, 13, 556 (1952); Keys, *Circulation*, 5, 115 (1952); Key et al., *Clin. Chem.*, 1, 34 (1955)).

In 1957, Keys, Anderson and Grande, *The Lancet*, 2:959-66, demonstrated that human serum-cholesterol levels were influenced by the quality of the fats rather than the quantity. It was demonstrated that the intake of saturated fatty acids containing 12 or more carbon atoms produced increased serum cholesterol levels in humans. Unsaturated fatty acids were found to lower serum cholesterol levels.

Grande, Anderson and Keys, *Am. J. Clin. Nut.*, 23 (9), 11841193 (1970), disclosed that serum cholesterol and serum phospholipids levels are higher in men having diets rich in palm oil ($C_{16:0}$) when compared to men having diets rich in stearic acid ($C_{18:0}$).

Bonanome and Grundy, *N. Eng. J. of Med.*, 318:1244-8 (1988), have recently suggested that stearic acid ($C_{18:0}$) is as effective as oleic acid ($C_{18:1}$) in lowering plasma cholesterol levels when either replaces palmitic acid in the diet.

Solid fat products, e.g. shortening and margarine, contain high levels of saturated fatty acids; typically $C_{12:0}$, $C_{14:0}$, $C_{16:0}$ and $C_{18:0}$. These saturated fatty acids are necessary to maintain the desired physical and functional characteristics of the solid fat product.

Many fat/oil-containing nonliquid food compositions used today, e.g. shortening, margarine, require specific blends of fats and oils to produce the desired characteristics. The fat constituent of these blended products is referred to as a hardstock fat or hardstock. The desired functional characteristics of hardstock fats in shortenings are:

- melting point between 35° C. to 70° C.;
- capability to form a workable plastic composition when blended with the desired oils (mixture rheology); and
- provide a stable fat/oil matrix at room temperatures in the form of a specific crystalline structure.

The melting point and physical behavior of fats and oils are determined by the fatty acid composition of the triacylglyceride. Long chain saturated fatty acids form linear chains that can fit compactly together, resulting in high van der Waals attractions; therefore, triacylglycerides containing long chain saturated fatty acids are solid fats. The following saturated triacylglyceride can fit into a solid lattice and is, therefore, a solid (i.e. fat):

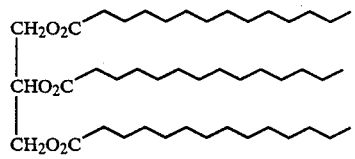

Unsaturated fatty acids contain kinks or bends that prevent the formation of neat compact lattices, therefore, triacylglycerides containing unsaturated fatty acids are liquid fats (oils). The following unsaturated triacylglyceride cannot fit into a solid lattice and is, therefore, a liquid (i.e. oil):

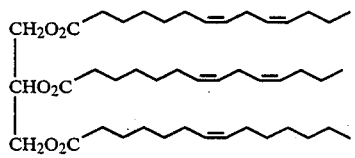

High melting point triacylglycerides (MP≧70° C.) are undesirable as hardstock fats because they tend to be waxy. Low melting point triacylglycerides are also undesirable as hardstock fats because they tend to be oil-like.

Triacylglyceride fats made from saturated fatty acids with more than about 17 carbon atoms are relatively reduced in calories because the fatty acids are poorly absorbed by the body. Unfortunately, the high melting point of these fatty acids gives them a waxy, unpalatable taste. For example, tristearin and tribehenin are seldom used in foodstuffs because of their waxiness.

Triacylglycerides are unique compounds in that they exhibit multiple melting points. The multiple melting point behavior (polymorphism) is the result of triacylglycerides crystallizing into distinct crystalline structures. The α form is the lowest melting and least stable. This form transforms to the more stable and intermediate melting β' form. In some triacylglycerides the β' form is the most stable, but generally, the highest melting β form is the most stable. In single-acid, triacylglycerides, the transformation order is α→β'→β. Mixed acid triacylglycerides and triacylglyceride mixtures show a much more complicated polymorphic behavior with the existence of multiple β' and β forms depending upon the detailed triacylglyceride structures at hand.

Crystal stucture is also especially important to the properties of shortenings and specialty fats, e.g. cocoa butter. It is well known in the art that certain kinds of fat crystals, most notably the beta-prime (β') crystals, have the capacity to form a rigidly interlocking structure when suspended in a liquid component if the crystals are present in sufficient amounts. This results in a mixture which does not separate and which has a good creaming ability.

It is, therefore, important that the solid glycerides of a shortening be of the proper crystal type. A shortening that crystallizes in the beta-phase form often tends to be waxy or grainy. While these characteristics are desirable in some instances, and shortenings have been formulated to have a beta-phase crystalline structure, the most acceptable commercial plastic shortenings have good creaming ability and retain their appearance, volume and performance characteristics under adverse storage conditions. In order to provide such shortenings it is necessary that the solid triacylglycerides crystallize and remain in the beta-prime crystalline form.

In general, the method of attaining the beta-prime form desired for plastic shortening is to add a suitable "beta-prime-tending" highly hydrogenated or saturated fat as the hardstock. Included in this category are such fats as hydrogenated tallow, cottonseed oil, palm oil, certain of the fish oils, and rapeseed oil. Since the beta crystalline phase of triacylglycerides is more thermodynamically stable than the beta-prime-phase, even highly beta-prime-tending hardstocks tend to undergo transformation into the beta-phase, especially under adverse storage conditions. Thus it is highly desirable in the formulation of a plastic shortening to provide a highly beta-prime-phase tending hardstock. U.S. Pat. No. 3,597,230, Colby et al., issued Aug. 3, 1971, discloses certain combinations of β'-tending hardtocks which co-act in a manner to provide 2 plastic shortening having improved polymorphic stability of the β' crystalline phase.

The following references further describe the polymorphic phase structure of edible fats: Chapman, *Chemical Reviews*, 62, #5, 433-56 (1962); Jackson and Lutton, J. Am. Chem. Soc., 72, 519-21 (1950); Jackson and Lutton, J. Am. Oil Chem. Soc., 27, 276 (1950); U.S. Pat. No. 3,129,102, Sanders, issued Apr. 14, 1964; U.S. Pat. No. 3,265,507, Japikse, issued Aug. 9, 1966; and U.S. Pat. No. 2,521,242, Mitchell, issued Sept. 5, 1950.

In order to provide the above mentioned desirable hardstock characteristics, typical vegetable oils and animal fats used in foods contain long chain fatty acids. Generally, these are predominantly 12 to 18 carbons long and contain zero to three double bonds. Some oils, such as rapeseed oil, contain fatty acids having 20 or 22 carbons or higher.

Several references disclose triacylglycerides containing medium chain and long chain fatty acids. For example, U.S. Pat. No. 3,353,964, Seiden, issued Nov. 21, 1967, discloses a margarine oil made from corandomized triacylglycerides containing saturated fatty acids having 6-14 carbon atoms and saturated fatty acids having 20-22 carbon atoms. The triacylglycerides, a corandomized blend of hydrogenated rapeseed oil with coconut and/or palm kernel oil, are high in lauric acid ($C_{12:0}$).

U.S. Pat. No. 4,390,561, Blair et al., issued June 28, 1983, discloses margarine compositions containing triacylglycerides made from palmitic ($C_{16:0}$) or stearic ($C_{18:0}$), oleic ($C_{18:1}$)), and linoleic acid ($C_{18:2}$).

U.S. Pat. No. 4,526,793, Ingenbleek et al., issued July 2, 1985, discloses lipid compositions for oral external or parenteral nutrition which include gamma-linoleic acid containing triacyglycerides.

U.S. Pat. No. 4,590,087, Pronketal, issued May 20, 1986, discloses triacylglycerides containing palmitic ($C_{16:0}$) and $C_{18-24}$ fatty acids which have butter-like properties and a reduced tendency to develop graininess.

U.S. Pat. No. 4,607,052, Mendy et al., issued Aug. 19, 1986, discloses triacylglycerides of the formula:

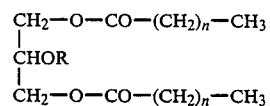

where R represents an acyl fragment of a polyunsaturated fatty acid containing 18 to 22 carbon atoms, the acyl fragment being capable of being oxidized, and wherein n represents an integer varying from 2 to 16. The triacylglycerides are used as nutritional supplements to provide a source of polyunsaturated fatty acids.

Japanese patent application (Kokai) No. 62-295,996, Shoji et al., published Dec. 23, 1987, discloses a method of preparing plastic fats with improved spreadability. These plastic fats are prepared by directed ester exchange a 10° C.-25° C. of a mixture containing 75-95% (wt) of a liquid vegetable oil (e.g. safflower oil or sunflower) and 5-25% (wt) of a behenic acid-containing fat (e.g. rapeseed oil and mustard oil.) Shoji et al. do not identify the specific triacylglyceride products of the disclosed method.

Japanese patent application (Kokai) No. 63-022,133, published Jan. 29, 1988, discloses fat/oil compositions for pie pastry which are comprised of $C_{20:0}$-$C_{24:0}$ saturated fatty acids and $C_{16}$-$C_{22}$ unsaturated fatty acids and triglycerides containing the radicals of the fatty acids. These compositions are characterized by their good extending and spreading properties.

The art suggests that excessive consumption of fats containing $C_{12:0}$-$C_{16:0}$ saturated fatty acids leads to an increase in plasma cholesterol levels, resulting in an increase incidence of arterial disease. However, the art does not provide a means of reducing the levels of these fatty acids in a hardstock fat while retaining the desired hardstock characteristics (i.e. melting point, mixture rheology, and β'-tending crystalline form).

It is the object of the present invention to provide a hardstock fat which (1) has little or no $C_{12:0}$-$C_{16:0}$ saturated fatty acid acyl groups (2) has a melting point between 35° C. to 70° C., (3) is capable of forming a workable plastic composition when blended with the desired oils and (4) provides a stable fat/oil matrix at room temperatures in the form of a β'-tending crystalline form. These hardstock fats are further characterized by their lack of waxy mouth feel and by their being relatively reduced in calories.

It is also an object of the present invention to provide food compositions containing the above mentioned hardstock.

SUMMARY OF THE INVENTION

Hardstock fat compositions of the present invention comprise at least about 8% of a triacylglyceride, wherein one acyl group is $C_{18:2}$ fatty acid acyl group and the remaining acyl groups can independently be $C_{18:0}$–$C_{26:0}$ fatty acid acyl groups; from 0% to about 92% of a triacylglyceride, wherein 2 or 3 of the acyl groups are $C_{18:2}$ fatty acid acyl groups and the remaining acyl groups are saturated or unsaturated fatty acid acyls having from about 18 to 26 carbon atoms; and from 0% to about 92% of a triacylglyceride, wherein the acyl groups can independently be saturated or unsaturated fatty acid acyl groups having from about 18 to about 26 carbon atoms and wherein no acyl groups are $C_{18:2}$ acyl groups. The position of the unsaturated fatty acid acyl group glyceride is not critical.

The present invention also includes comestible compositions containing the above mentioned hardstock fat. Preferred comestible compositions include those containing from about 5% to about 80% of the above mentioned hardstock fat. A plastic shortening containing from about 18 to about 35% of the hardstock fat is the most preferred comestible composition.

DETAILED DESCRIPTION OF THE INVENTION

All weights and ratios used herein are on a weight basis unless otherwise specified.

As used herein the fatty acid acyl groups are given the following "$C_{x:y}$" designation, wherein x is the number of carbon atoms and y is the number of double bonds.

As used herein the terms "hardstock" and "hardsotck fat" refer to triacylglycerides or mixtures of triacylglycerides having a melting point greater than 35° C.

As used herein the term "functional hardstock" and "functional hardstock fat" refers to triacylglycerides or mixtures of triacylglycerides which (1) have a melting point between 35° C. and 70° C., (2) form a workable plastic composition when blended with desired oils, and (3) provide a stable fat/oil matrix at room temperature.

As used herein the term "base stock" refers to the oil component in comestible compositions.

As used herein, the term "acyl" refers to an organic acid group in which the —OH of the carboxyl group is replaced by some other substituent.

As used herein, the term "plastic" shortening defines a solid, non-fluid, and non-pourable shortening at possible storage temperatures (20° C. to 38° C.). Said shortening must have a yield point high enough to prevent product flow at room temperature, that is, it must be sufficiently solid to prevent product deformation under its own weight in packages containing ordinary commercial unit quantities.

As used herein, the term and "stable shortening" refers to a fat/oil composition which remains homogeneous and does not separate when exposed to a centrifugal force of about 15,600 G for about 18 min. at a temperature of about 22° C. This may be accomplished with a microcentrifuge, model 5414 manufactured by Eppendorf.

Also, as used herein, the terms "beta-prime-phase-tending", "beta-prime-tending" and "β'-tending" define an overall tendency of certain triacylglyceride solids to crystallize in the beta-prime phase. This does not mean, however, that under proper conditions triglyceride solids cannot be transformed from a beta-prime phase to a beta-phase. The types of polymorphic crystalline structures of fats can be identified by their X-ray diffraction patterns and are described in U.S. Pat. Nos. 2,521,241 and 2,521,242, granted to Paul J. Mitchell, Jr., Sept. 5, 1950, incorporated herein by reference. The plastic shortenings of the present invention have a majority of their solid crystals in the beta-prime phase, particularly when stored under normal conditions, e.g., 20° C. to 38° C.

The hardstock fats of the present invention comprise at least about 8% of a triacylglyceride of the formula:

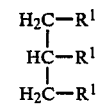

where one $R^1$ is a $C_{18:2}$ fatty acid acyl and the remaining $R^1$'s are independently selected from $C_{18:0}$–$C_{26:0}$ (preferably one $C_{18:0}$ and one $C_{22:0}$; or two $C_{22:0}$'s). The preferred level of the above mentioned triacylglyceride is at least about 14%, and most preferred level is 100%. Typical commercial hardstock fats will comprise from about 14% to about 35% of the above mentioned triacylglyceride.

As used herein, the terms "food" and "comestible" refer to any manner of viand for usage by man. "Food" and "Comestible" may further include individual food components or mixtures thereof.

The hardstock fats of the present invention often contain mixtures of triacylglycerides having various configurations of $C_{18:2}$ and $C_{18:0}$–$C_{26:0}$ saturated fatty acid acyl components. These additional triacylglycerides may be present in the hardstock at levels from 0% to about 92%. Examples of these are:

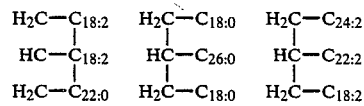

Furthermore, the remainder of the hardstock compositions may also comprise other standard fats or fat-like materials. The hardstock fats of the present invention, preferably, are essentially free of cholesterolemic $C_{12:0}$–$C_{16:0}$ fatty acid components while retaining all the desired characteristics for shortening applications. In other words, the triacylglyceride hardstocks of the present invention have the following specific functional characteristics:

melting point between 35° C. to 70° C.;
form a workable plastic shortening when blended with the desired oils;
provides a stable β' crystalline structure; and
provide a stable fat/oil matrix at room temperatures.

Another characteristic of the hardstock of the present invention is that it may be low in calories when compared with conventional hardstocks. This is the result of the high levels of long and very long saturated fatty acid acyl groups (i.e. $\geq C_{18:0}$). These fatty acids are only poorly absorbed and metabolized by the human body.

Method of Preparation

The triacylglycerides of the present invention can be prepared by a wide variety of techniques such as:
(a) random rearrangement of triacylglycerides (fats-/oils);
(b) esterification of glycerol with a blend of the corresponding fatty acids; and
(c) transesterification of a blend of the corresponding fatty acid methyl esters with glycerol.

Random rearrangement of triacylglycerides is well-known in the art, as is the esterrification of glycerol with fatty acids. Methods for random rearrangement of triacylglycerides and estrerification of glycerol with fatty acids are described, for example in Hamilton et al., *Fats and Oils: Chemistry and Technology*, pp. 93–96, Applied Science Publishers Ltd., London (1980), and Swern, *Bailey's Industrial Oil and Fat Products*, 3d ed., pp. 941–943 and 958–965 (1964), both disclosures incorporated by reference herein. Transesterifification is also discussed generally in *Bailey's Industrual Oils and Fat Products*, supra, at pp. 958–963.

The hardstock fats are geenerally made by blending and randomizing various edible fats/oils. However, the invention is not limited by the method of preparation; other methods known to the art for making hardstock fats can also be used. Suitable fats/oils for hardstock preparation (using the rearrangement process) are completely hydrogentraed rapeseed oil, hydrogenated marine oils, safflower oil, sunflower oil, soybean oil, cottonseed oil, corn poil, and rapeseed oil.

The hardstock fats can be refined, bleached, deoderized, or processed in other ways not inconsistent with the purposes of the invention.

A principal advantage of the present hardstock fats is that they contain little or no saturated $C_{12:0}$ to $C_{16:0}$ fatty acid acyl groups. Ingestion of large amounts of these fatty acids is known to promote hypercholesterolemia.

Comestible Compositions

The principal comestible application for the above mentioned hardstock facts is in the area of plastic shortenings.

Plastic shortening compositions are prepared from a mixture of hardstock fats and base stock oils. The content of solids is an important control parameter used in shortening formulations. The iodine value (I.V.) of an oil or fat indicates the number of grams of iodine equivalent to the halogen absorbed by a 100 gram sample. In general, the lower the iodine value of a given fat or oil, the greater will be its content of solids at a given temperature. That is, as the triacylglyceride molecules become more saturated (i.e. the double bond content decreases), the consistency of the fat or oil becomes more solid. The iodine value can be readily determined by the well-known Wijs method. (See Wijs, *J. Am. Soc. Chem. Ind.*, 17, 698 (1898))

The plastic shortenings of the present invention comprise from about 5% to about 35%, preferably from about 18% to about of the above-mentioned hardstock compositions. It is preferred that the triacylglyceride plastic shortening hardstock has an iodine value of less than about 60, preferably from about 45 to about 60, and most preferably about 51.

The plastic shortenings of the present invention also comprise from about 65% to about 95%, preferably from about 65% to about 82% glyceride base stock having an iodine value greater than about 50, preferably less than about 150 and most preferably from about 90 to about 130. The base stock can be an edible glyceride oil or a partially hydrogenated glyceride oil or fat having the specified iodine value. Suitable base stock glycerides can be derived from animal, vegetable, or marine sources, including naturally occurring triacylglyceride oils and fats such as cottonseed oil, soybean oil, peanut oil, coconut oil, palm kernel oil, olive oil, palm oil, corn oil, rapeseed oil, sunflower seed oil, sesame oil, safflower oil, sardine oil, lard, tallow and the like. Very highly unsaturated oils may require some hydrogenation to improve their resistance to oxidative deterioration. Hydrogenation to reduce the iodine value of these highly unsaturated oils to less than about 130 generally is sufficient for purposes of this invention. Methods for hydrogenating unsaturated oils are well known in the art. A preferred base stock is rapeseed oil, having an iodine value of from abut 70 to about 130, preferably from about 110 to about 120.

Other suitable base stock glycerides having iodine values greater than about 50 for use in this invention can be derived from natural or synthetic fats and oils containing in the glyceride molecule long chain acyl radicals having from about 12 to about 24 carbon atoms such as lauroyl, lauroleoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, behenoyl, erucoyl, brassidoyl, clupadonoyl, lingoceroyl, and/or selacholeoyl. A portion of the base stock glyceride also can contain in the molecule one or two short chain acyl groups having from 2 to about 10 carbon atoms such a acetyl, propanoyl, butanoyl, pentanoyl, hexanoyl and the like. Suitable base stock also can be derived from randomly and low temperature interesterified fatty triglyceride containing oils and fats such as interesterfied cottonseed oil and lard.

Suitable partial hydrogenation of the liquid rapeseed oil to form the preferred base stock of this invention can be carried out by conventional methods, and is typically carried out by a batch process whereby the oil is contracted with hydrogen in the presence of nickel catalyst.

The shortenings of the present invention can also contain minor amounts of flavorings, emulsifiers, anti-splattering agents, anti-sticking agents, anti-oxidants, or the like.

The plastic shortenings of this invention can be prepared by various conventional means well known in the art for processing plastic shortenings. In general, conventional methods of preparing plastic shortenings involve the steps of heating the shortening to a temperature above the melting point of its solid components (typically, 38° C.–100° C.) to form a melt, injecting edible gas (e.g., 10–25 volume percent) into the melt, passing the melted shortening through a scraped wall heat exchanger to form a supercooled mixture (e.g., 10° C.–21° C.) containing small crystals, continuing crystallization into the plastic state while mildly agitating in one or more stages, and then tempering at a constant temperature (e.g., 27°–32° C.) while at rest for several hours (e.g., 12–60 hours).

Other optional fat or fat-like materials useful in the present hardstock containing comestibles include non-caloric or reduced calorie fats, such as branched chain fatty acid triacylglycerides, sucrose polyethers, highly esterified polyglycerol esters, and acetin fats. The present fats can also be combined with nondigestible fats and oils such as the $C_8$–$C_{22}$ fatty acid polyesters of sugars and sugar alcohols wherein the sugar or sugar alcohol has from 4 to 8 hydroxyl groups and wherein at least 4 hydroxyl groups are esterified. See U.S. Pat. Nos. 3,600,186, Mattson et al., issued Aug. 17, 1971; 4,005,196, Jandacek, issued Jan. 25, 1977; and 4,034,083, Mattson, issued July 5, 1977; all incorporated by reference herein, which disclose preferred fatty acid polyesters of sugars and sugar alcohols. These fatty acid polyester of sugars or sugar alcohols can replace from about 10% to about 92% of the fat in shortening compositions.

Examples of other comestible applications for the present hardstock fats include, but are not limited to, salted and/or fried snacks, other snacks, desserts, baking mixes and other prepared mixes, processed meat products, frozen desserts, salad dressings, cooking oils, salad oils, margarines, spreads, whipped toppings, peanut butter, frostings, confectionery fillings and other confectioneries, cookies, cakes, pie crusts, pastry crusts, breads, and other baked goods, and other baking, cooking or frying products. The hardstock fats can also be used as pharmaceutical carriers. These comestibles may contain from about 5% to about 80% of the present hardstock fat and from about 20% to about 95% of non-hardstock ingestible materials (e.g. oils, sugars, flours, starches, meats, vegetables, dairy products, flavorings, etc.)

EXAMPLE I

Preparation of High Purity $C_{18:0}$, $C_{18:2}$, $C_{22:0}$ Triacylglyceride Hardstock

1. Synthesis of diacylglyceride (behenoyl-1-stearoyl-glycerol)

100 g (279.3 mmol) of 1-monostearin is dissolved in 750 ml of warm chloroform (Note: the chloroform is washed three times with distilled water, dried over $MgSO_4$, and filtered before use). 24.8 ml (307.2 mmol) of pyridine is then added to the solution. (Note: the pyridine is dried over 3A molecular sieves, manufactured by Linde, before use). 110 g (307.2 mmol) of behenoyl chloride is dissolved in 250 ml of washed chloroform and added dropwise to the well stirred solution. The reaction is gently warmed with a heating mantel and is stirred overnight (16 hrs.) Upon completion of the reaction, the solvent is removed under reduced pressure. The remaining solid/oil is transferred to a 2 liter beaker and 1 liter of acetone/ethanol 50:50 is added. The mixture is heated to boiling and the remaining solids filtered. The filtrate is then placed in a 50° C. incubator overnight and filtered. The filtrate is cooled to room temperature and any solid diacylglyceride is removed by suction filtration.

2. Synthesis of triacylglyeride (linoleoyl-behenoyl-1-stearoyl-glycerol)

63 g (92.5 mmol) of diacylglyceride from step 1 is dissolved in 1 of washed chloroform followed by 11.2 ml (138.8 mmol) of dried pyridine. After the solution is warmed slightly, 41.5 g (138.8 mmol) of linoleoyl chloride is added dropwise to the well stirred solution. The reaction flask is blanketed with nitrogen and stirred at room temperature. Thin Layer Chromatography (TLC) is used to confirm the formation of the triacylglyceride (Rf=0.72, pet ether/ethyl ether/acetic acid, 75:25:1). After 3 days, the reaction mix is placed in a 2 liter separatory funnel and washed two times with 500 ml water, three times with 500 ml 0.1 N HCl, and three times with 500 ml water. The organic layer is dried over 12-28 mesh silica gel and filtered. Excess solvent is removed under reduced pressure, which results in an oil. The oil is recrystallized in 1 liter of acetone at room temperature. The triglyceride solid is collected by suction filtration and recrystallized again in acetone. The final product is vaccuum dried and stored under nitrogen at −20° C. 44 g of $C_{18:0}$, $C_{18:2}$, $C_{22:0}$ triacylglyceride (95% purity) is typically produced.

EXAMPLE II

Commercial Hardstock Manufacture

The following process is useful in preparing a hardstock fat having about 14% $C_{18:2}$, $C_{18:0}$, $C_{22:0}$ triacylglyceride:

Hydrogenated rapeseed oil (I.V.) and safflower oil are mixed in a ratio of 2:1 and heated with stirring to 180° C. in a fluted reactor. After the headspace is swept with nitrogen to remove existing moisture, the catalyst, Na/K allow in xylene, is added (approximately 1 5 ml of Na/K suspension/200 g reactant). The reaction is immediate and is continued for 15 minutes. The heating is then discontinued and the reaction mixture allowed to cool to 80° C. Aqueous phosphoric acid (85%) is added to the cooled mix to neutralize the catalyst. After vigorous stirring, the aqueous phase is separated and discarded. The oil phase is returned to the reactor, blanketed with nitrogen, and washed twice at 50°–70° C. with half volume $H_2O$, washed one with half volume isopropanol/$H_2O$/$CaCl_2$ (30:70:1), and finally washed with $H_2O$. The product is dried and partially deodorized in the reactor under reduced pressure at 130°–135° C.

EXAMPLE III

Shortening Formulation

The following formula is useful for providing a stable plastic shortening when prepared using the conventional methods described above:

Rapeseed Oil (I.V.-130): 76%
Hardstock Fat (as prepared in Example II): 20%
Mono and Diglycerides (as emulsifiers): 4%

The ingredients are combined in a clean vessel and heated above the melting point of the hardstock fat to form a melt. 15 volume percent of edible gas is injected into the melt. The melted shortening is passed through a scraped wall heat exchanger at 15° C. to form a supercooled mixture. The shortening is mildly agitated while crystallization continues. Finally the shortening is tempered at 30° C. for 36 hours.

EXAMPLE IV

Preparation of brownies low in $C_{12:0}$–$C_{16:0}$ fatty acids

| Ingredient | Amount (gms) |
| --- | --- |
| Table Sugar (i.e. sucrose) | 309.8 g |
| Flour | 152. g |
| Plastic Shortening (as prepared in Example III) | 50 g |
| Cocoa | 35.3 g |
| Starch | 11.7 g |
| Conventional additives (flavors and an amount of baking soda) | 6.2 g |
| Eggs | 50 g |
| Oil | 63 g |
| Water | 80 g |

The ingredients are stirred with a large spoon until well blended (about 50 strokes or 1 minute) to form a batter. The batter is poured into a lightly greased 33 cm×23 cm×5cm pan, and then baked at 180° C. for about 26.5 minuted to produce the finished brownies.

EXAMPLE V

Preparation of cookies low in $C_{12:0}$–$C_{16:0}$ fatty acids and low in calories

| Ingredients | Amounts (gms) |
| --- | --- |
| Table Sugar (i.e., sucrose) | 352 |
| Flour | 328 |
| Erythritol tetraester of olive oil fatty acid (a fatty acid polyester of a sugar alcohol used as a shortening) | 100 |
| Plastic Shortening (as prepared in Example III) | 100 |
| Egg | 96 |
| Water | 20 |
| Conventional additives (flavors and a small amount of baking soda) | 8 |

The ingredients are combined and the resulting dough is kneaded until uniform. Dough balls (10–13 gm) are individually placed on a lightly greased cooked tray and then baked at 180° C. for 7–8 minutes to produce finished cookies.

EXAMPLE VI

Preparation of a white cake low in $C_{12:0}$–$C_{16:0}$ fatty acids

| Ingredients | Amount (gm) |
| --- | --- |
| Table Sugar (i.e., sucrose) | 133 |
| Cake Flour | 107 |
| Plastic Shortening (as prepared in in Example III) | 47.5 |
| Double-acting baking powder | 6.7 |
| Milk | 130 |
| Egg whites | 60 |
| Vanilla | 2.5 |

The ingredients are stirred with an electric mixer to form a uniform batter. The batter is poured into a lightly greased 33 cm×23 cm×5cm pan, and then baked at 180° C. for 40 minutes to produce the finished white cake.

What is claimed is:

1. A plastic shortening composition comprising:
   (a) from about 65% to about 95% of a triglyceride fat or oil base stock having an iodine value of less than 150; and
   (b) from about 5% to about 35% of a beta prime tending hardstock with a melting point between 35° C. and 70° C., said hardstock consisting essentially of:
      (i) from about 14% to 100% of a triglyceride esterified with a $C_{18:2}$ fatty acid and the remaining fatty acids are selected from the group of $C_{18}$–$C_{26}$ saturated fatty acids; and
      (ii) from about 86% to 0% of a mixture of triglycerides esterified with one or more saturated or unsaturated $C_{18}$–$C_{26}$ fatty acids.

2. A plastic shortening composition according to claim 1 comprising from about 18% to about 35% of said hardstock.

3. A shortening according to claim 1 wherein said triglyceride has an iodine value of from 50 to about 150.

4. A shortening to claim 3 wherein said hardstock comprises a hardstock fat comprising at least about 14% of a triglyceride esterified with a $C_{18:2}$ fatty acid group and two $C_{22}$ fatty acids.

5. A shortening according to claim 3 further comprising from about 65% to about 95% of a base-stock selected from the group consisting of soybean, corn, sunflower, rapeseed, low erucic acid rapeseed, canola, peanut, coconut, palm kernel, palm, sardine oil, lard, tallow, cottonseed, olive, safflower, sesame, synthetic oils, and mixtures thereof.

6. A shortening according to claim 5 wherein said base-stock is partially hydrogenated.

7. A shortening according to claim 6 wherein said base-stock is rapeseed oil.

8. A shortening according to claim 1 wherein from about 10% to about 92% of said base stock triglyceride fat is replaced by a $C_8$–$C_{22}$ fatty acid polyester of a sugar or sugar alcohol where the sugar or sugar alcohol has from 4–8 hydroxyl groups and wherein at least 4 hydroxyl groups are esterified.

* * * * *